US006786845B1

(12) United States Patent
Haka

(10) Patent No.: US 6,786,845 B1
(45) Date of Patent: Sep. 7, 2004

(54) MULTI-SPEED POWER TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/391,834

(22) Filed: Mar. 18, 2003

(51) Int. Cl.[7] .................................................. F16H 3/62
(52) U.S. Cl. ....................................... 475/275; 475/303
(58) Field of Search ................................ 475/275, 276, 475/303

(56) References Cited

U.S. PATENT DOCUMENTS

2004/0023748 A1 * 2/2004 Haka .......................... 475/303

* cited by examiner

*Primary Examiner*—Dirk Wright
(74) *Attorney, Agent, or Firm*—Leslie C. Hodges

(57) ABSTRACT

A multi-speed planetary transmission having mechanical clutches and two simple planetary gearsets. The mechanical clutches are operated between the transmission input shaft and output shaft to control powerpaths through the planetary gearsets in a manner to establish ten forward speed ratios and one reverse speed ratio. One of said mechanical clutches being operable to selectively interconnect two members of one of the planetary gearsets to another of said mechanical clutches both independently and simultaneously.

5 Claims, 1 Drawing Sheet

10 12 ENGINE 18 46 28 28A 28B 28C 28D 38 42 20 38 36 34 40 26B 26 26C 26D 26A 24C 44 24B 24A 24 14 30 30B 30A 30C 50 22 52 54 56 32 32A 32B 32C 46 48 48 OUTPUT 58 16 FINAL DRIVE

| Gear | Ratio | Synchronizer 24 | 26 | 28 | 30 | 32 |
|---|---|---|---|---|---|---|
| Rev | −7.52 | S1 | R1 | C1 | S2 | R2 |
| 1st | 7.64 | R1 | C1 | S1 | S2 | R2 |
| 2nd | 4.70 | C1 | C1 | OPEN | S2 | R2 |
| 3rd | 3.30 | S1 | C1 | R1 | R2 | S2 |
| 4th | 2.60 | S1 | C1 | R1 | SR&R2 | OPEN |
| 5th | 2.06 | R1 | C1 | S1 | R2 | S2 |
| 6th | 1.62 | R1 | C1 | S1 | S2&R2 | OPEN |
| 7th | 1.27 | C1 | C1 | OPEN | R2 | S2 |
| 8th | 1.00 | C1 | C1 | OPEN | S2&R2 | OPEN |
| 9th | .78 | C1 | R1 | S1 | R2 | S2 |
| 10th | .62 | C1 | R1 | S1 | S2&R2 | OPEN |

S1 = Sun Gear 36
R1 = Ring Gear 38
C1 = Carrier 44
OPEN = NEUTRAL
S2 = Sun Gear 48
R1 = ring Gear 50

MULTI-SPEED POWER TRANSMISSION

TECHNICAL FIELD

This invention relates to power transmissions and, more particularly, to power transmissions employing a plurality of mechanical clutches and planetary gearing.

BACKGROUND OF THE INVENTION

Multi-speed power transmissions, which employ mechanical clutches such as synchronizers, generally include pairs of meshing gears to establish drive or speed ratios between a transmission input shaft and a transmission output shaft. These transmissions require a pair of meshing gears for each of the forward drive ratios and one and a half pairs of gears for the reverse ratio. Each of the gear pairs includes a synchronizer or mechanical clutch, which engages one of the gears with either the main shaft or the countershaft while the other gear of that mesh is continuously driven by or with one of the other shafts.

For example, a ten speed transmission having a single reverse would require ten and a half pairs of gears, at least ten synchronizers, and a movable idler gear for the reverse ratio. The reverse ratio normally would include the input gear for first gear and an idler gear and a separate output gear. Thus, the reverse ratio is relatively close to or nearly equal to the numerical value of the first ratio.

More recently, it has been proposed to include planetary gearing in manual type transmissions. In these transmissions, multiple planetary gearsets are included. In each of the transmissions, at least one of the gearsets is a compound gearset. As is well known, compound gearsets require additional pinion sets, which increase the complexity and overall cost of a planetary gearset.

SUMMARY OF THE INVENTION

The present invention seeks to provide a multi-speed transmission having two planetary gearsets and a plurality of mechanical clutch mechanisms.

It is therefore an object of the present invention to provide an improved multi-speed power transmission.

In one aspect of the present invention, the transmission includes two planetary gearsets each of which is a simple planetary gearset.

In another aspect of the present invention, the transmission has incorporated therein two three-way synchronizers and three two-way synchronizers, which are effectively controlled to provide ten forward speed ratios and one reverse speed ratio between an input shaft and an output shaft.

In a further aspect of the present invention, one of the planetary gearsets includes a sun gear member and two identical ring gear members.

In yet a further aspect of the present invention, one of the planetary gearsets includes two identical sun gear members and one ring gear member.

In a yet still further aspect of the present invention, the dual ring gear members and dual sun gear members of each of the planetary gearsets is provided to permit input and output drives from more than one of the planetary members.

DESCRIPTION OF AN EXEMPLARY EMBODIMENT

Figures 1, 2:
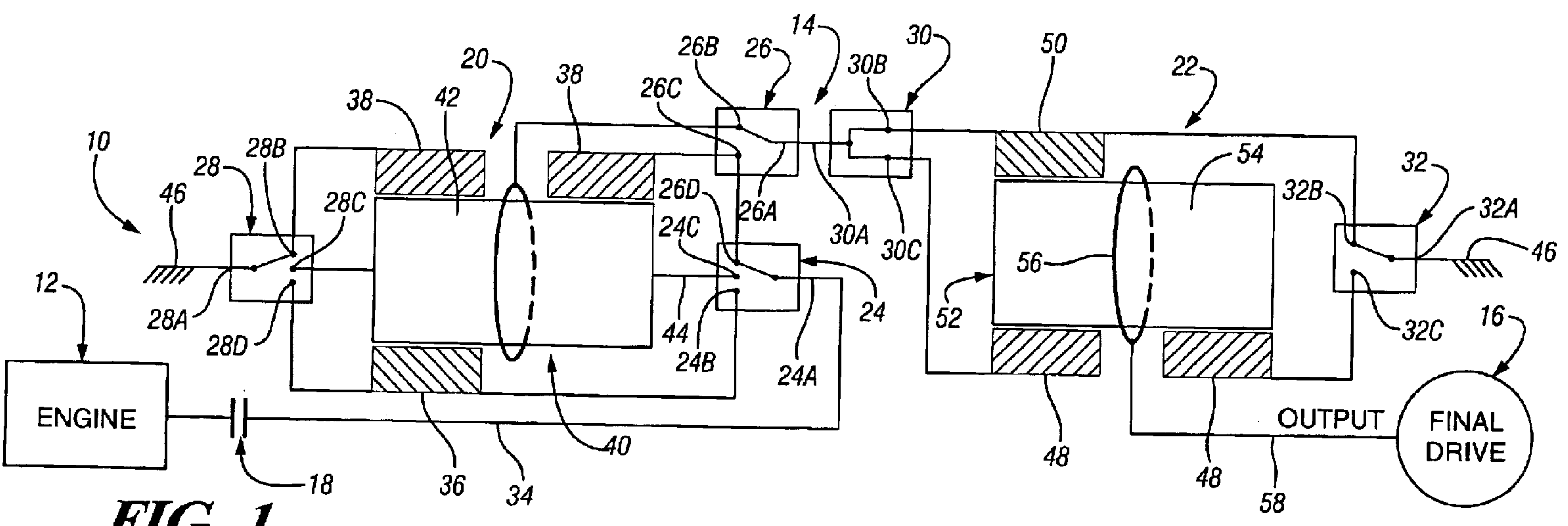
FIG. 1 is a schematic representation of a powertrain having a transmission incorporating the present invention.
FIG. 2 is a chart describing the engagement sequence of the mechanical clutches employed with the transmission shown in FIG. 1.

Referring to the drawings, there is seen in FIG. 1 a powertrain 10 having an engine 12, a power transmission 14, and a conventional final drive mechanism 16. The engine 12 is a conventional internal combustion engine. The transmission 14 has an input clutch 18, a pair of planetary gearsets 20 and 22, and five mechanical clutches or synchronizers 24, 26, 28, 30, and 32.

The mechanical clutch 24 has an input portion 24A and three output positions 24B, 24C, and 24D. The input portion 24A is continuously connected through an input shaft 34 with the input clutch 18, which is a conventional friction type clutch, which might be either fluid engaged or mechanically engaged. Such clutches and their operation are well known in the art of power transmissions. The input portion 24A is selectively connectible with each of the output portions 24B, 24C, and 24D. The mechanical clutch 24 is a rotating type torque transmitting mechanism.

The mechanical clutch 26 has an output portion 26A and two input positions 26B and 26C. The mechanical clutch 26 is a rotating type torque transmitting mechanism.

The mechanical clutch 28 has a ground portion 28A and three input positions 28B, 28C, and 28D. The mechanical clutch 28 is a stationary type torque transmitting mechanism.

The mechanical clutch 30 has an input portion 30A and two output portions 30B and 30C. The mechanical clutch 30 is a dual position synchronizer in which the input portion 30A may be connected to each of the output portions 30B and 30C individually and connected to both of the portions 30B and 30C simultaneously. The mechanical clutch 30 is a rotating type torque transmitting mechanism.

The mechanical clutch 32 has a ground portion 32A and two input positions 32B and 32C. The mechanical clutch 32 is therefore a stationary torque transmitting mechanism.

The planetary gearset 20 has a sun gear member 36, ring gear members 38, and a planet carrier assembly member 40. The planet carrier assembly member 40 includes a plurality of pinion gears 42, which are rotatably disposed on a planet carrier member 44 and placed in meshing relationship between the sun gear member 36 and the ring gear members 38.

The planet carrier member 44 is continuously connected with the position 24C of mechanical clutch 24 and the position 28C of the mechanical clutch 28. The sun gear member 36 is continuously connected with the position 24B and with the position 28B. One of the ring gear members 38 is continuously connected with the position 28B and the other ring gear member 38 is continuously connected with the position 24C. The ring gear members 38 are identical in construction, each therefore having the same number of teeth and meshing with an elongated pinion 42. The input portion 24A of mechanical clutch 24 is continuously connected with the input shaft 34, as previously mentioned, the ground position 28A of the mechanical clutch 28 is connected with a stationary portion or housing 46 of the transmission 10.

One ring gear member 38 is continuously connected with both the position 24D of synchronizer 24, and position 26C of synchronizer 26. The synchronizers 26 and 30 are continuously interconnected by their respective portions 26A and 30A.

The planetary gearset 22 has split sun gear members 48, a ring gear member 50, and a planet carrier assembly member 52. The planet carrier assembly member 52 has a plurality of pinion gears 54 rotatably mounted on a planet carrier member 56 and disposed in meshing relationship between the split sun gear members 48 and the ring gear member 50. The planet carrier member 56 is continuously drivingly connected with a transmission output shaft 58, which in turn is connected with the final drive mechanism 16.

The ring gear member 50 is continuously connected with the position 30B of synchronizer 30 and with the position 32B of the synchronizer 32. One sun gear member 48 is connected continuously with the position 30C of synchronizer 30 and the other portion of sun gear member 48 is connected with the position 32C of the synchronizer 32. The ground portion 32A of the synchronizer 32 is continuously connected with the stationary portion 46.

As seen in the chart of FIG. 2, the synchronizers or mechanical clutches are selectively controlled to establish ten forward speed ratios and a reverse speed ratio between the input shaft 34 and the output shaft 58. In the chart of FIG. 2, the terminology S1 is the sun gear member 36, R1 is the ring gear member 38, and C1 is the planet carrier member 44. Also in the chart, S2 is the sun gear members 48 and R2 is the ring gear member 50. The synchronizers 28 and 32 are shown as open in several of the transmission ratios. This indicates that the synchronizer 28, for example, does not ground any member and the synchronizer 32 does not ground any member. When the synchronizer 28 is open, the planetary gearset 20 is in a neutral or 1:1 condition, and when the synchronizer 32 is open, the planetary gearset 22 is also in a neutral or 1:1 condition.

The synchronizer 24 is effective to connect each of the members 36, 38, and 44 individually with the input shaft 34, which is then connected with the engine 12 through the judicious engagement of the clutch 18. The synchronizer 30 is effective in fourth, sixth, eighth, and tenth ratios to interconnect the ring gear member 50 with the sun gear members 48 thereby placing the planetary gearset 22 in a 1:1 condition. Note that to place the planetary gearset 20 in a 1:1 condition, the planet carrier member 44 is connected to both the synchronizer 24 and the synchronizer 26. This connects the input shaft 34 directly with the synchronizer 26 to the planet carrier member 44.

The chart of FIG. 2 also describes an example of the numerical values for the ratios that are available with the transmission described in FIG. 1. Those skilled in the art will recognize that the multi-speed transmission 10 employs two simple planetary gearsets and five synchronizers to accomplish ten forward speed ratios and a reverse speed ratio.

The planetary gearsets 20 and 22 are both simple planetary gearsets, that is, there is a single gear mesh at the sun gear and at the ring gear member by a single pinion member. Those skilled in the art will also recognize that the planet carrier member will have mounted thereon a plurality of pinion gears to equally distribute the torque loads between the sun gear member and the ring gear member. In any event, there is only one active mesh between the pinion and the sun gear member and between the pinion and the ring gear member. The use of a second identical sun gear member and ring gear member is incorporated to allow the proper connections of input, output, and ground as required for the various ratios of the transmission.

The use of simple planetary gearsets significantly reduces the manufacturing complexities as well as assembly complexities and the overall cost of a power transmission. Simple planetary gearsets also have an advantage of reduced pinion to carrier speeds and reduced torque related losses.

What is claimed is:

1. A multi-speed transmission comprising:

an input shaft;

an output shaft;

a first simple planetary gearset includes ring gear means, a planet carrier assembly member; and a sun gear member;

a second simple planetary gearset includes a ring gear member, a planet carrier assembly member, and sun gear means, said planet carrier assembly member being continuously connected with said output shaft;

a first mechanical clutch means selectively interconnecting said input shaft with said ring gear means, said planet carrier assembly member, and sun gear member of said first planetary gearset;

a second mechanical clutch means selectively independently interconnecting each of said ring gear means, said planet carrier assembly member, and said sun gear member of said first planetary gearset with a transmission housing;

a third mechanical clutch means selectively connectible with said ring gear means and said planet carrier assembly member of said first planetary gearset;

a fourth mechanical clutch means independently selectively connecting said third mechanical clutch with said ring gear member and said sun gear means of said second planetary gearset;

a fifth mechanical clutch means independently selectively connecting said ring gear member and said sun gear means of said second planetary gearset with said housing;

all five said mechanical clutches each having a neutral position;

said first, third, and fourth mechanical clutch means being rotating type torque transmitting mechanisms, said second and fifth mechanical clutch means being stationary type torque transmitting mechanisms and said five mechanical clutch means being selectively positionable to establish interconnections through and between said first and second planetary gearsets, and said transmission housing to establish ten forward speed ratios and one reverse speed ratio between said input shaft and said output shaft.

2. The multi-speed transmission defined in claim 1 further comprising:

said fourth mechanical clutch means selectively connecting said third mechanical clutch with both said ring gear member and said sun gear means independently and simultaneously.

3. The multi-speed transmission defined in claim 1 further comprising:

said five mechanical clutch means all being selectively engaged during the reverse speed ratio and during four of said forward speed ratios.

4. The multi-speed transmission defined in claim 2 further comprising:

said fourth mechanical clutch means being selectively operated to engage said sun gear means and said ring gear member of said second planetary gearset simultaneously during four of said forward speed ratios; and said fifth mechanical clutch means being in said neutral position when said same four forward speed ratios.

5. The multi-speed transmission defined in claim 1 further comprising:

said third mechanical clutch means being said neutral position forward speed ratios.

* * * * *